May 3, 1960 L. H. HEUER 2,934,785
COUNTERBALANCE SPRING
Filed July 29, 1957 2 Sheets-Sheet 1
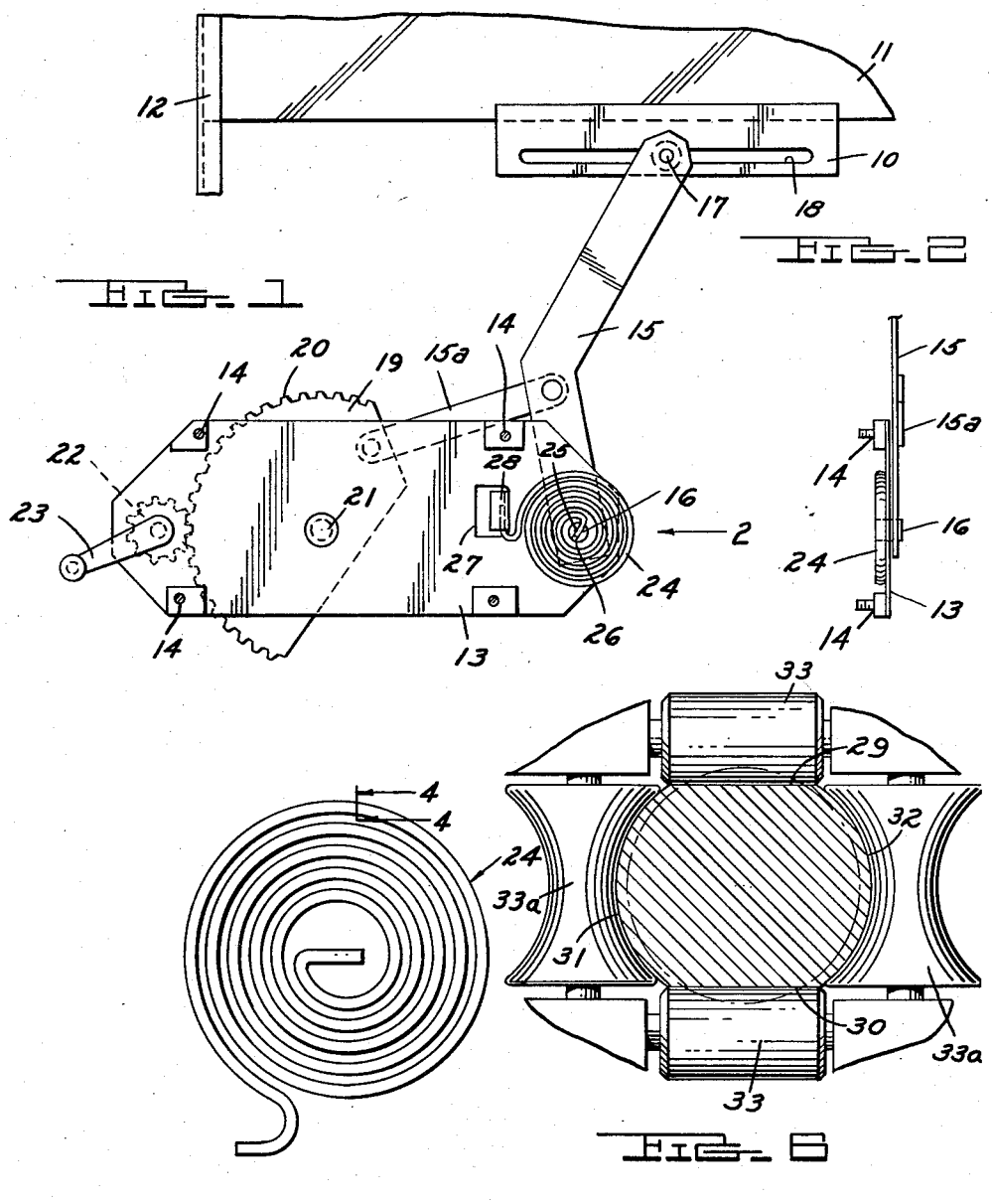
INVENTOR.
LAWRENCE H. HEUER
BY
ATTORNEYS May 3, 1960 L. H. HEUER 2,934,785
COUNTERBALANCE SPRING
Filed July 29, 1957 2 Sheets-Sheet 2

INVENTOR.
LAWRENCE H. HEUER
BY
*Barnes, Kisselle, Laughlin & Raisch*
ATTORNEYS

United States Patent Office 2,934,785
Patented May 3, 1960

2,934,785

COUNTERBALANCE SPRING

Lawrence H. Heuer, Detroit, Mich.

Application July 29, 1957, Serial No. 674,699

3 Claims. (Cl. 16—200)

This invention relates to counterbalance springs and particularly to counterbalance springs used in automobiles in connection with window regulators, trunk lids for luggage compartments and hoods of engine compartments.

Springs have long been used in the automobile industry to yieldingly support or counterbalance the weight of a member and yieldingly urge a member in one direction. One type of counterbalance spring comprises a spiral having a plurality of convolutions lying in a single plane.

In such springs certain basic requirements have long been known and recognized as being desirable. First, the counterbalance spring must be such that there is a uniform build up of torque load as the spring is wound up thereby creating a smoother action. Second, the counterbalance spring must be such that there is a minimum of friction between successive convolutions as the spring is wound up. Third, the counterbalance spring must be low in cost. Fourth, the counterbalance spring must be light in weight not only to lower the weight of the automobile but, in addition, to decrease the shipping costs involved in shipping the springs to the automobile assembly plant. Fifth, the counterbalance spring should be small in size, in a direction parallel to its axis in order that it may be used where space is at a minimum, such as in a window regulator in the door of an automobile.

For many years up to the present time, the spiral counterbalance springs used in the automobile industry have comprised a flat strip of metal stock having a width several times its thickness which is coiled to form the spiral spring with the greater dimension or width extending in a direction parallel to the axis of the spring. When such a counterbalance spring is used, the rate of build up as the spring is wound is found to be not as efficient as would be desired. Moreover, as the spring is wound the friction caused by contact of successive convolutions along the wider dimension is substantial, resulting in an inaccurate load. The cost of such flat spiral springs is relatively high because of the great amount of material used in the springs and the multiple operations required in order to produce the spring stock. The large amount of material used in the springs makes the springs heavy, resulting in further cost due to high shipping charges. When a great counterbalance force is required, the spring is increased in strength by making it wider. Because the spring is wider in a direction parallel to its axis, it has become increasingly difficult to utilize the spring in applications in the automobile industry where space is at a minimum, such as in the window regulator in the door or side panel of an automobile.

It is therefore an object of this invention to produce an improved counterbalance spring.

It is a further object of this invention to produce such a counterbalance spring which has a uniform build up of torque as it is wound up.

It is a further object of this invention to produce such a counterbalance spring which produces a minimum of friction between successive convolutions.

It is a further object of this invention to produce such a counterbalance spring which has a lower cost than the flat type counterbalance spring.

It is a further object of this invention to produce a counterbalance spring which is lighter in weight than the flat type counterbalance spring.

It is a further object of this invention to produce such a counterbalance spring which has a lesser dimension in a direction parallel to the axis of the spring than the flat type counterbalance spring.

Basically, the counterbalance spring embodying the invention comprises a plurality of convolutions forming a spiral, the convolutions lying in a common plane and the cross-sectional convolution of each spring being non-circular and comprising parallel straight sides in a direction parallel to the axis of the spring connected by curved convex sides.

In the drawings:

Fig. 1 is an elevational view of a window regulation embodying the invention.

Fig. 2 is a fragmentary end elevational view of the window regulator shown in Fig. 1.

Fig. 3 is an elevational view of the counterbalance spring embodying the invention, the spring being shown in an untensioned state.

Fig. 6 is a fragmentary perspective view of an apparatus for making the spring embodying the invention.

Figure 5:
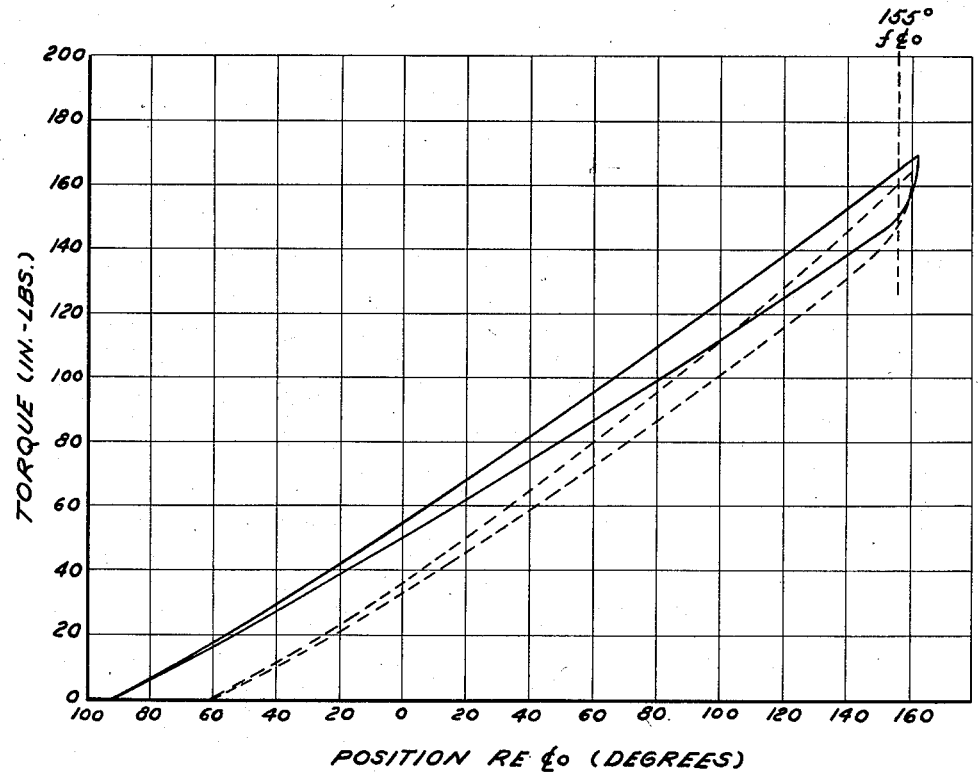
Fig. 5 is a graph showing the operating characteristics of a spring embodying the invention as compared with a flat type spring.

Referring to Fig. 1, a window regulator used in the door or side panel of an automobile to control the movement and position of a window comprises a member 10 which engages the lower end of window 11. Window 11 is guided in its movement vertically by guides, one of which is shown at 12. A support 13 in the form of a vertical plate is mounted on the side of the door or panel by bolts 14. An arm 15 has a pin 16 mounted on the lower end thereof and passing through an opening in plate 13 for rotatably supporting arm 15 on plate 13. The upper end of arm 15 is provided with a pin 17 extending in a horizontal slot 18 in member 10. A sector 19 formed with an arcuate row of teeth 20 is pivoted to plate 13 at 21. A pinion 22 is rotatably mounted on plate 13 adjacent the sector 19 with its teeth in engagement with the teeth 20 of sector 19. A handle 23 is fastened on the shaft of pinion 22 so that pinion 22 may be rotated manually. A counterbalance spring 24 has the inner end 25 thereof extending radially and engaging a transverse slot 26 in pin 16. The outer end 27 of spring 24 extends generally tangentially and engages a tab 28 struck out of plate 13. As mounted on the window regulator, spring 24 is stressed or partly wound up in all positions of the window.

As shown in Fig. 1, spring 24 is in position of least tension or wind up and rotation of handle 23 in a counterclockwise direction will rotate sector 19 and move arm 15 clockwise through lever 15a to lower window 11 and to wind up spring 24 and increase the tension in spring 24. When the handle 23 is rotated in a clockwise direction the window will be raised, the raising being assisted by the force supplied by spring 24 as it unwinds.

Figure 4:
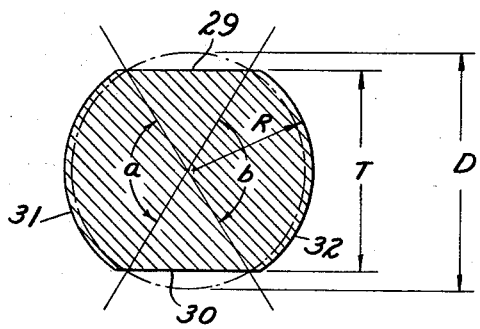
Fig. 4 is a sectional view taken along the line 4—4 in Fig. 3, on a greatly enlarged scale.

As shown in Fig. 3, counterbalance spring 24 comprises a plurality of convolutions lying in a single plane. Each convolution has a non-circular cross section as shown in Fig. 4 including flat parallel sides 29, 30 connected by convex curved sides 31, 32. Flat sides 29, 30 extend in a direction parallel to the axis of the spring and perpendicular to the plane of the spring.

Spring 24 is made by coiling flattened metal stock. The metal stock is flattened by passing a length of circular metal stock S between rolls 33 in a single pass with the sides of the metal restrained by rolls 33a which have concave surfaces 35. By this operation, the circular stock, shown by dotted lines in Fig. 4, is flattened with the lateral sides being forced outwardly so that the dimension of the stock between curved sides 31, 32 is greater than the original diameter of the metal stock. The degree of flattening is preferably 30% of the original diameter of the metal stock, that is, the thickness T between surfaces 29, 30 is preferably approximately 70% of the original diameter D. This will result in the width of the stock (approximately 2R as distinguished from the distance D) being approximately one and one-half times as great as the distance of thickness T. In addition the width of the rolled stock is approximately one and one-half times as great as either of the lateral widths of surfaces 29 and 30. The radius R of the curved sides 31, 32 is equal to at least 63% of the thickness T and the angular extent of curved portions 31, 32 preferably ranges from 168 to 170°. As shown in Fig. 4, the sum of angles $a$ and $b$, representing the angular extent of curved portions 31, 32 is preferably 168 to 170°.

It should be understood that in making the spring it may be necessary to stress-relieve and draw the spring after flattening or after coiling in accordance with well-known practice to provide the necessary spring temper.

Fig. 5 represents the curve of torque versus angular position, when spring 24 is utilized as a counterbalance spring and is wound up. The build up of the torque of a spring made in accordance with the invention is shown by the solid line. As can be seen, the build up is quite uniform and approaches a straight line. This may be contrasted to a counterbalance spring of the flat type wherein the width of the spring in a direction parallel to the axis is several times the thickness in a direction perpendicular to the axis, the action of which is shown in dotted lines in Fig. 5. The build up of torque for a flat type spring is at a higher rate than that of the spring embodying the invention.

Although I do not wish to be bound by the theory involved, in my opinion, the beneficial results obtained by a counterbalance spring embodying the invention are due, in part, to the utilization of the dimension in a direction perpendicular to the axis of the spring in order to obtain spring load. In addition, the use of the flat sides 29, 30 having a minimum width produces the necessary contact between successive convolutions to prevent overriding of the convolutions when the spring is wound up without producing excessive friction between successive convolutions.

A spring made from stock in accordance with the invention not only has an improved rate of build up of torque and a reduced degree of friction between successive convolutions but, in addition, is substantially lower in cost than the flat type counterbalance spring. Less material is required to make the spring, thus, resulting in material saving. In addition, fewer operations are required in order to produce the metal stock so that it can be coiled. The lower weight of the springs results in substantial savings in shipping costs.

Since the spring embodying the invention is substantially less in width in a direction parallel to its axis, it can more readily be used in applications where space is at a minimum, such as in doors or panels of an automobile of present-day design.

The springs embodying the invention have been fatigue tested and have been found to have better stress characteristics under such testing.

I have found that flat type springs can be replaced by springs embodying the invention as shown as follows:

| Flat type weight, pounds | New type weight, pounds |
|---|---|
| 0.475 | 0.350 |
| 0.316 | 0.270 |
| 0.320 | 0.248 |

The use of less material in the spring embodying the invention as shown above results in a substantial savings. In addition since the spring stock can be made with fewer mechanical operations, additional savings in cost are realized.

It can thus be seen that I have provided an improved counterbalance spring which has a uniform build up of torque, a minimum of friction between successive convolutions, is lower in cost, lighter in weight and has a lesser dimension in a direction parallel to the axis of the spring than the prior flat type springs.

It can thus be seen that I have provided a counterbalance spring which approaches the ideal circular cross section and yet has the proper configuration to prevent the adjacent convolutions from sliding axially relative to one another when the spring is wound up.

I claim:

1. In the combination comprising a support, a member adapted to be operatively connected to a window or the like, said member being pivoted to said support and movable between at least two positions, a counterbalance spiral spring having one end thereof operatively connected to said member and the other end thereof operatively connected to said support, the improvement wherein said spiral spring comprises a plurality of convolutions lying in a common plane, said spring being under tension throughout the normal movement of said member, the cross-sectional configuration of said spring being non-circular and comprising parallel straight sides connected by generally curved convex sides, said straight sides extending in a direction parallel to the axis of the spring and contacting when the spring is wound up, the cross section of said spring being narrow between said straight sides and thick between said convex sides to afford a generally elliptical shape, the diametrical distance between said convex sides being approximately one and one-half times the distance between said straight sides, whereby when said spring is wound up, the straight sides of adjacent convolutions will come in contact with each other.

2. In the combination comprising a support, a member adapted to be operatively connected to a window or the like, said member being pivoted to said support and movable between at least two positions, a counterbalance spiral spring having one end thereof operatively connected to said member and the other end thereof operatively connected to said support, the improvement wherein said spiral spring comprises a plurality of convolutions lying in a common plane, said spring being under tension throughout the normal movement of said member, the cross-sectional configuration of said spring being non-circular and comprising parallel straight sides connected by generally curved convex sides, said straight sides extending in a direction parallel to the axis of the spring and contacting when the spring is wound up, the cross section of said spring being narrow between said straight sides and thick between said convex sides to afford a generally elliptical shape, the diametrical distance between said convex sides being approximately one and one-half times the lateral width of said straight sides, whereby when said spring is wound up, the straight sides of adjacent convolutions will come in contact with each other.

3. In the combination comprising a support, a member adapted to be operatively connected to a window or the like, said member being pivoted to said support and movable between at least two positions, a counterbalance spiral spring having one end thereof operatively connected to said member and the other end thereof operatively connected to said support, the improvement wherein said spiral spring comprises a plurality of convolutions lying in a common plane, said spring being under tension throughout the normal movement of said member, the cross-sectional configuration of said spring being non-circular and comprising parallel straight sides connected by generally curved convex sides, said straight sides extending in a direction parallel to the axis of the spring and contacting when the spring is wound up, the cross section of said spring being narrow between said straight sides and thick between said convex sides to afford a generally elliptical shape, the diametrical distance between said convex sides being approximately one and one-half times the lateral width of said straight sides, and each of said convex sides having a radius which is at least 63% of the thickness measured between straight sides, the angular extent of each of said curved convex sides ranging from about 168° to 170°, whereby when said spring is wound up, the straight sides of adjacent convolutions will come in contact with each other.

References Cited in the file of this patent

UNITED STATES PATENTS

| | | |
|---|---|---|
| 266,737 | Watson et al. | Oct. 31, 1882 |
| 1,063,505 | Byrnes | June 3, 1913 |
| 1,166,870 | Wieser | Jan. 4, 1916 |
| 1,388,913 | Bagg | Aug. 30, 1921 |
| 2,616,688 | Floraday | Nov. 4, 1952 |